(12) United States Patent
Sako et al.

(10) Patent No.: US 7,543,217 B2
(45) Date of Patent: Jun. 2, 2009

(54) METHOD OF DETERMINING SUITABILITY OF A RECORDING MEDIUM FOR BEING RECORDED TO AND/OR REPRODUCED FROM BY AN APPARATUS

(75) Inventors: Yoichiro Sako, Tokyo (JP); Mitsuhiro Shimada, Chiba (JP); Koichi Sato, Tokyo (JP); Tatsuya Inokuchi, Kanagawa (JP); Atsuhiro Kumagai, Kanagawa (JP)

(73) Assignee: Sony Corporation (JP)

( * ) Notice: Subject to any disclaimer, the term of this patent is extended or adjusted under 35 U.S.C. 154(b) by 268 days.

(21) Appl. No.: 11/018,232

(22) Filed: Dec. 21, 2004

(65) Prior Publication Data

US 2005/0099910 A1    May 12, 2005

Related U.S. Application Data

(62) Division of application No. 09/937,574, filed as application No. PCT/JP01/00923 on Feb. 9, 2001, now Pat. No. 7,016,279.

(30) Foreign Application Priority Data

Feb. 10, 2000    (JP) ............................. 2000-38208
Apr. 26, 2000    (JP) ............................. 2000-125817

(51) Int. Cl.
    *G11C 29/00*    (2006.01)
(52) U.S. Cl. .......................... 714/768; 714/769
(58) Field of Classification Search .............. 714/768, 714/769
    See application file for complete search history.

(56) References Cited

U.S. PATENT DOCUMENTS

| | | | |
|---|---|---|---|
| 4,512,006 A * | 4/1985 | Murakami et al. | ....... 369/59.25 |
| 4,800,549 A | 1/1989 | Yamagami et al. | |
| 4,893,193 A | 1/1990 | Nakamura et al. | |
| 4,953,035 A | 8/1990 | Yoshio et al. | |
| 5,289,450 A | 2/1994 | Mizumoto et al. | |
| 5,448,048 A * | 9/1995 | Oshiba | ........................ 235/454 |
| 5,774,389 A * | 6/1998 | Iwamura | ...................... 714/784 |
| 5,841,793 A | 11/1998 | Fukuda | |

(Continued)

FOREIGN PATENT DOCUMENTS

EP    0 536 764 A1    4/1993

(Continued)

*Primary Examiner*—M. Mujtaba K Chaudry
(74) *Attorney, Agent, or Firm*—Lerner, David, Littenberg, Krumholz & Mentlik, LLP.

(57) ABSTRACT

Suitability of a recording medium for being recorded to and/or reproduced from by an apparatus is determined. Address information is read from a recording medium having at least a first area in which data is recordable, a second area, and a third area. The second area is followed by the first area which is followed by the third area. The address information includes first address information, which represents the position of the second area, and/or second address information which represents the position of the third area. A possible error in the address information is detected based on an error detection code generated for the address information. Whether the recording medium is suitable for being recorded to or reproduced from by the apparatus is determined based on a result of the detecting step. The recording medium is suitable when no error is detected and is unsuitable when an error is detected.

22 Claims, 8 Drawing Sheets

U.S. PATENT DOCUMENTS

| | | | |
|---|---|---|---|
| 5,872,905 A * | 2/1999 | Ono et al. | .................... 714/5 |
| 6,061,313 A | 5/2000 | Shigemori | |
| 6,157,609 A | 12/2000 | Shoji et al. | |
| 6,205,099 B1 | 3/2001 | Sasaki et al. | |
| 6,240,055 B1 | 5/2001 | Takamine et al. | |
| 6,249,499 B1 | 6/2001 | Andoh et al. | |
| 6,377,525 B1 | 4/2002 | Iida | |
| 6,385,744 B1 | 5/2002 | Ando et al. | |
| 6,411,574 B1 | 6/2002 | Su et al. | |
| 6,424,615 B1 | 7/2002 | Ishimura et al. | |
| 6,473,380 B1 | 10/2002 | Takahashi | |
| 6,519,217 B1 | 2/2003 | Kawashima et al. | |
| 6,519,676 B1 | 2/2003 | Suzuki et al. | |
| 6,545,959 B1 | 4/2003 | Iida | |
| 6,577,574 B1 | 6/2003 | Heemskerk et al. | |
| 6,657,938 B1 | 12/2003 | Sako et al. | |
| 6,707,784 B2 | 3/2004 | Sako et al. | |
| 6,714,509 B2 | 3/2004 | Kumagai et al. | |
| 6,804,188 B1 | 10/2004 | Shishido et al. | |
| 6,819,640 B1 | 11/2004 | Iida | |
| 7,016,279 B2 * | 3/2006 | Sako et al. | ............... 369/47.54 |

FOREIGN PATENT DOCUMENTS

| | | |
|---|---|---|
| EP | 1 089 281 A2 | 4/2001 |
| EP | 1089281 | 4/2001 |
| JP | 63-293762 | 11/1988 |

\* cited by examiner

Fig. 7

| M1 | S1 | F1 | CONTENTS OF INFORMATION |
|---|---|---|---|
| 0 | 0 | 0 | ADDRESSES OF PROGRAM AREA AND LEAD-OUT AREA |
| 1 | 0 | 0 | ADDRESSES OF PA, PMA, AND LEAD-IN AREA |
| 1 | 0 | 1 | SPECIAL INFORMATION 1: WRITE POWER AT REFERENCE SPEED |
| 1 | 1 | 0 | SPECIAL INFORMATION 2: START ADDRESS OF LEAD-IN AREA |
| 1 | 1 | 1 | SPECIAL INFORMATION 3: FINAL VALID START ADDRESS OF LEAD-OUT AREA |
| 0 | 0 | 1 | ADDITIONAL INFORMATION 1: NOT USED (RESERVED) |
| 0 | 1 | 0 | ADDITIONAL INFORMATION 2: NOT USED (RESERVED) |
| 0 | 1 | 1 | ADDITIONAL INFORMATION 3: NOT USED (RESERVED) |

Fig. 8

| FRAME NUMBER | CONTENTS OF FRAME |
|---|---|
| N | SPECIAL INFORMATION 1 |
| N+1 ⋮ N+9 | REGULAR ADDRESSES |
| N+10 | SPECIAL INFORMATION 2 |
| N+11 ⋮ N+19 | REGULAR ADDRESSES |
| N+20 | SPECIAL INFORMATION 3 |
| N+21 ⋮ N+29 | REGULAR ADDRESSES |
| N+30 | SPECIAL INFORMATION 1 |
| N+31 ⋮ N+39 | REGULAR ADDRESSES |
| N+40 | SPECIAL INFORMATION 2 |
| N+41 ⋮ N+49 | REGULAR ADDRESSES |
| N+50 | SPECIAL INFORMATION 3 |
| N+51 ⋮ | REGULAR ADDRESSES |

Fig. 9

| DISC REPRODUCTION DURATION | CLV | LEAD-IN POSITION | LEAD-IN LENGTH | LEAD-IN START TIME |
|---|---|---|---|---|
| 64 MINUTES | 1.4m/sec | 23.0~24.9mm | 02:07:48 (min) | 97:52:27 |
| | | 22.9~24.9mm | 02:14:06 (max) | 97:45:69 |
| 74 MINUTES | 1.2m/sec | 23.0~24.9mm | 02:28:68 (min) | 97:31:07 |
| | | 22.9~24.9mm | 02:36:32 (max) | 97:23:43 |

Fig. 10

| Manufacturer | 1st CODE (74 MINUTES) | 2nd CODE (64 MINUTES) |
|---|---|---|
| A | 97m28s40f~97m28s49f | |
| B | 97m23s60f~97m23s69f | |
| C | 97m29s00f~97m29s09f | |
| D | 97m26s10f~97m26s19f | 97m47s40f~97m47s49f |
| E | 97m24s10f~97m24s19f | |
| F | 97m23s10f~97m23s19f | |
| | | CHARACTERS CHARACTERS CHARACTERS CHARACTERS |
| G | 97m24s00f~97m24s09f | 97m46s00f~97m46s09f |
| H | 97m32s00f~97m32s29f | 97m49s00f~97m49s09f |
| CHARACTERS CHARACTERS CHARACTERS CHARACTERS | CHARACTERS CHARACTERS CHARACTERS CHARACTERS | CHARACTERS CHARACTERS CHARACTERS CHARACTERS |
| I | 97m26s00f~97m26s09f | 97m28s40f~97m28s49f |

METHOD OF DETERMINING SUITABILITY OF A RECORDING MEDIUM FOR BEING RECORDED TO AND/OR REPRODUCED FROM BY AN APPARATUS

CROSS-REFERENCE TO RELATED APPLICATIONS

The present application is a divisional of U.S. application Ser. No. 09/937,574, filed Feb. 26, 2002, now U.S. Pat. No. 7,016,279, issued Mar. 21, 2006, which is a national stage application under 35 U.S.C. § 371 of International Application No. PCT/JP01/00923, filed Feb. 9, 2001, which claims priority from Japanese Application No. P2000-038208, filed Feb. 10, 2000, and Japanese Application No. P2000-125817, filed Apr. 26, 2000, the disclosures of which are incorporated herein by reference.

BACKGROUND OF THE INVENTION

1. Technical Field

The present invention relates to a recording and/or reproducing method for a recording medium, a reproducing apparatus, a recording medium, a recording medium distinguishing method, and a recording and/or reproducing method for an apparatus using a recording medium suitable for a data recording medium on which address information that represents the positions of a lead-in area and so forth are recorded.

2. Background Art

In recent years, optical discs as large capacity recording mediums have been developed. For examples, CD (Compact Disc) for music information, CD-ROM for computer data, and DVD (Digital Versatile Disc or Digital Video Disc) for video information are known. These discs are read-only discs. More recently, optical discs such as CD-R (CD-Recordable) disc and CD-RW (CD-Rewritable) disc that allow data to be recorded and rewritten have been commercially used.

On the above-described disc shaped recording mediums such as CD, CD-ROM disc, CD-R disc, and CD-RW disc, a data management area referred to as lead-in area is formed on an inner periphery side of a program area in which data is recorded on. In addition, another area referred to as lead-out area is formed on an outer periphery of the program area. Addresses of time information as disc position information are assigned to those areas.

For example, on CD-R disc or CD-RW disc, a guide groove for a laser beam (hereinafter referred to as groove) is wobbled so as to successively pre-format address information. Position information or time information as wobble information is successively recorded. In CD-R disc/CD-RW disc, with reference to address information that is obtained by decoding wobble information, data is written to the disc. In CD-R disc/CD-RW disc, address information is obtained in such a manner that wobble information is extracted from a signal that is read from a disc with a signal that is frequency-modulated with a carrier of 22.05 kHz and then the extracted wobble information is demodulated. The address information is referred to as ATIP (Absolute Time In Pre-groove). An absolute addresses of a disc are represented by absolute time information.

An absolute address is composed of time information of minutes, seconds, and frames (namely, MSF format). In the MSF format, a decimal numeral of each of minutes, seconds, and frames is represented by BCD (Binary Coded Decimal). One second is equivalent to 75 frames. Addresses from 00 minute, 00 second, 00 frame to 99 seconds, 59 seconds, 74 frames can be represented. In BCD, one digit in decimal notation is represented by four bits in binary notation. In ATIP, 24 bits are required.

On CD-R disc or CD-RW disc, control signals other than time information are recorded by ATIP in the lead-in area. The control signals include the start address of the lead-in area (referred to as lead-in start time) and the maximum start address of the lead-out area (referred to as lead-out start time). The lead-in start time and the lead-out start time are information that is read by a drive when a CD-R/CD-RW is loaded to a recording and reproducing apparatus. They are important to use the loaded CD-R disc/CD-RW disc.

With error detection code (CRC) for each frame of ATIP, an error of address information of lead-in start time and lead-out start time can be detected. However, it is impossible to perfectly detect such an error. To improve the reliability of address information, error detection/correction encoding with higher performance may be used. To do that, the amount of redundant code such as parity is increased. As a result, the redundancy deteriorates. As with CD-R disc whose disc format has been already standardized, it is difficult to change error detection/correction code. In addition, depending on the application for use, even if a medium such as CD-R disc satisfies the standard, it may be required to use a medium with as small amount of eccentricity as possible. However, as long as a medium satisfies the standard, it is not necessary to distinguish such a disc. Thus, there is no way to distinguish discs.

Thus, an object of the present invention is to provide a recording and/or reproducing method for a recording medium, a reproducing apparatus, a recording medium, a recording medium distinguishing method, and a recording and/or reproducing method for an apparatus using a recording medium that allow an error of address information such as lead-in start time or lead-out start time that represents the position of an area to be detected with the address information itself and a disc to be distinguished with the address information.

SUMMARY OF THE INVENTION

The present invention is a recording and/or reproducing method for a recording medium, comprising the steps of:
  reading address information from a recording medium, the recording medium having at least a first area and a second area, data being recordable to the first area, the second area being followed by the first area, the address information representing the position of the second area;
  detecting an error corresponding to error detection code encoded for the address information that has been read from the recording medium; and
  when the result of the detecting step represents that an error has been detected in the address information that has been read from the recording medium, notifying at least a user that the error has been detected.

The present invention is a recording and/or reproducing method for a recording medium, comprising the steps of:
  reading address information from a recording medium, the recording medium having at least a first area and a second area, data being recordable to the first area, the second area being followed by the first area, the address information representing the position of the second area;
  detecting an error corresponding to error detection code encoded for the address information that has been read from the recording medium; and
  when the result of the detecting step represents that an error has been detected in the address information that has been read from the recording medium, prohibiting data from being recorded to at least the first area of the recording medium.

The present invention is a recording and/or reproducing method for a recording medium, comprising the steps of:

reading address information from a recording medium, the recording medium having at least a first area, a second area, and a third area, data being recordable to the first area, the second area being followed by the first area, the data record area being followed by the third area, the address information being at least one of first address information and second address information, the first address information representing the position of the second area, the second address information representing the position of the third area;

detecting an error corresponding to error detection code encoded for the address information of at least one of the first address information and the second address information that have been read from the recording medium; and when the result of the detecting step represents that an error has been detected in the address information of at least one of the first address information and the second address information that have been read from the recording medium, notifying at least a user that the error has been detected.

The present invention is a recording and/or reproducing apparatus for a recording medium, comprising:

a head for reading or reproducing data to/from a recording medium, the recording medium having at least a first area and a second area, data being recordable to the first area, the second area being followed by the first area;

an error checking portion for detecting an error corresponding to error detection code encoded for address information that has been read from the recording medium by the head, the address information representing the position of the second area; and a controlling portion for notifying at least a user that an error has been detected, when the result of error detection of the error checking portion represents that the error has been detected in the address information that has been read from the recording medium.

The present invention is a recording and/or reproducing apparatus for a recording medium, comprising:

a head for reading or reproducing data to/from a recording medium, the recording medium having at least a first area and a second area, data being recordable to the first area, the second area being followed by the first area;

an error checking portion for detecting an error corresponding to error detection code encoded for address information that has been read from the recording medium by the head, the address information representing the position of the second area; and a controlling portion for prohibiting data from being recorded to at least the first area of the recording medium, when the result of error detection of the error checking portion represents that the error has been detected in the address information that has been read from the recording medium.

The present invention is a recording and/or reproducing apparatus for a recording medium, comprising:

a head for reading or reproducing data to/from a recording medium, the recording medium having at least a first area, a second area, and a third area, data being recordable to the first area, the second area being followed by the first area, the data record area being followed by the third area;

an error checking portion for detecting an error corresponding to error detection code encoded for address information of at least one of first address information and second address information that have been read from the recording medium by the head; and a controlling portion for notifying at least a user that the error has been detected, when the result of error detection of the error checking portion represents that the error has been detected in the address information of at least one of the first address information and the second address information that have been read from the recording medium.

The present invention is a recording medium having:

a first area on which data is recordable;

a second area followed by the first area; and a third area preceded by the first area, wherein address information that represents at least the position of the second area is recorded by an error detection process with error detection code, and wherein the address information is a value that satisfies a predetermined calculation expression.

The present invention is a recording medium having:

a first area on which data is recordable;

a second area followed by the first area; and a third area preceded by the first area, wherein address information that represents at least the position of the second area is recorded by an error detection process with error detection code, and wherein a low order portion of the address information is selected corresponding to data that represents a manufacturer.

The present invention is a recording medium determining method, comprising the steps of:

reading address information from a recording medium loaded to an apparatus, the recording medium having at least a first area, a second area, and a third area, data being recordable to the first area, the second area being followed by the first area, the data record area being followed by the third area, the address information being at least one of first address information and second address information, the first address information representing the position of the second area, the second address information representing the position of the third area;

detecting an error corresponding to error detection code encoded for the address information of at least one of the first address information and the second address information that have been read from the recording medium; and determining whether or not the loaded recording medium is suitable for the apparatus corresponding to the result of the detecting step.

The present invention is a recording and/or reproducing method for an apparatus that uses a recording medium, comprising the steps of:

reading address information from a recording medium loaded to an apparatus, the recording medium having at least a first area, a second area, and a third area, data being recordable to the first area, the second area being followed by the first area, the data record area being followed by the third area, the address information being at least one of first address information and second address information, the first address information representing the position of the second area, the second address information representing the position of the third area;

detecting an error corresponding to error detection code encoded for the address information of at least one of the first address information and the second address information that have been read from the recording medium; and determining whether or not the loaded recording medium is suitable for the apparatus corresponding to the result of the detecting step.

According to the present invention, since address information such as lead-in start time is encoded so that an error thereof can be detected therewith, the reliability of the address information can be improved. For example, by improving the error resistance of lead-in start time, data can be stably recorded and reproduced. In addition, according to the present invention, since new parity is not required, even if for example signal format of a medium has been standardized, the present invention can be easily applied to the medium. In addition, according to the present invention, the error detected result is used to distinguish mediums. Thus, a recording/reproducing apparatus can use only a suitable medium. In this case, when a plurality of types of error detection encoding are performed, a plurality of types of mediums can be distinguished. In addition, according to the present invention, address information such as lead-in start time is encoded so that discs can be distinguished by itself. Thus, after it is determined whether or not a disc is suitable for an apparatus, data can be recorded to/reproduced from the disc.

BRIEF DESCRIPTION OF THE DRAWINGS

FIG. 7 is a schematic diagram showing the contents of information represented by the most significant bit of the address format;

FIG. 8 is a schematic diagram showing the contents of successive frames of a lead-in area of the address format;

FIG. 9 is a schematic diagram for explaining the margin of a lead-in area; and FIG. 10 is a schematic diagram showing an example of distinguishing a manufacturer using lead-in start time.

DETAILED DESCRIPTION

Best Modes for Carrying Out the Invention

Figure 1:
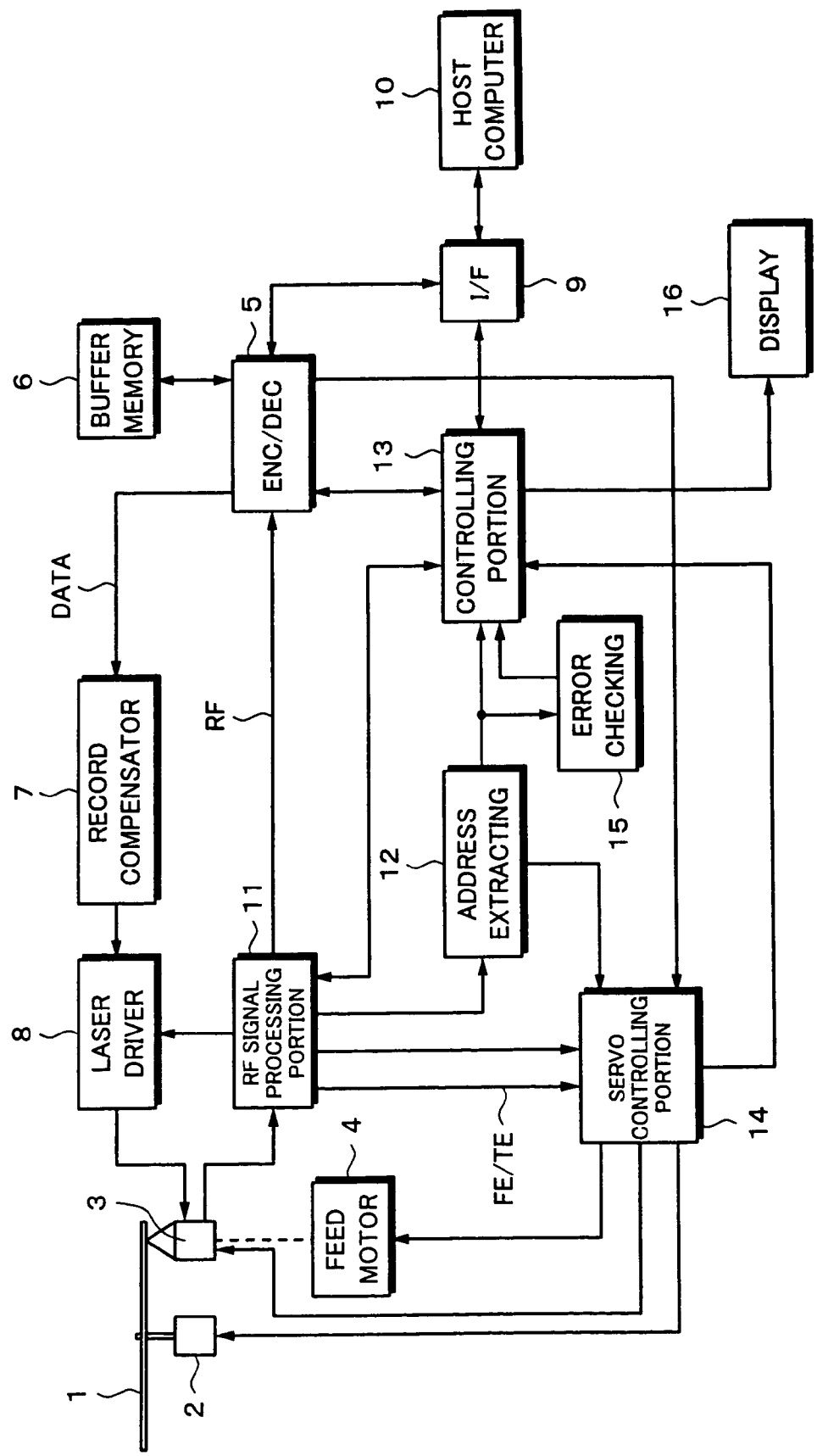
FIG. 1 is a block diagram showing the overall structure of a disc drive according to an embodiment of the present invention.

Next, an embodiment of the present invention will be described. The embodiment is an example of which the present invention is applied to CD-R. Next, with reference to FIG. 1, an example of a disc recording and reproducing apparatus (hereinafter simply referred to as drive) will be described. In FIG. 1, reference numeral 1 represents a recordable optical disc, for example, CD-R disc. The optical disc 1 is rotation-driven at constant linear velocity or constant angular velocity by a spindle motor 2. An optical pickup 3 is disposed to record data to the optical disc 1 and read data from the optical disc 1. The optical pickup 3 is moved in the radius direction of the disc 1 by a feed motor 4.

Figure 2:
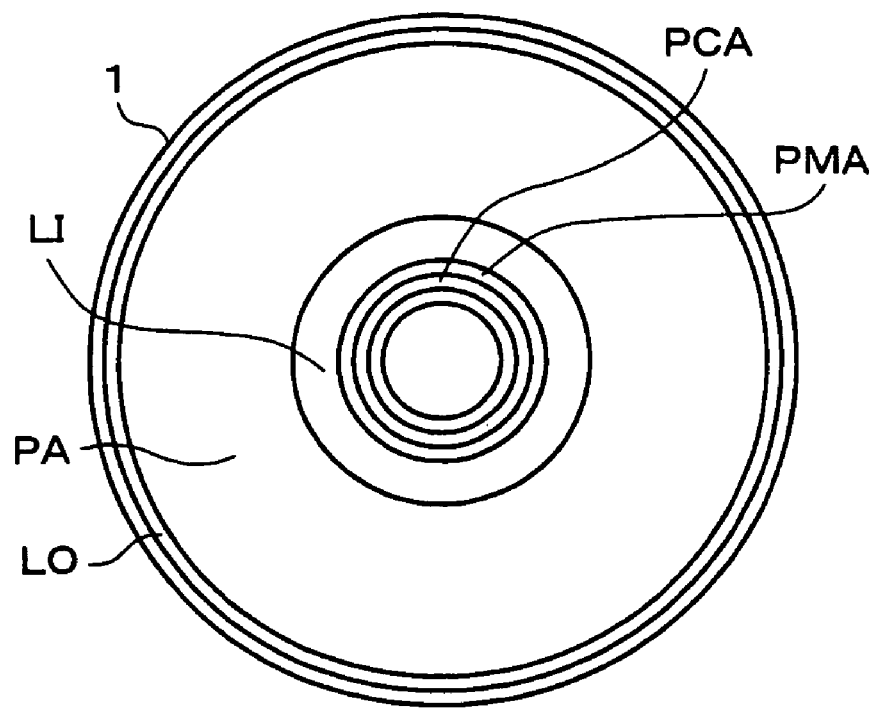
FIG. 2 is a schematic diagram for explaining areas of an optical disc according to the embodiment of the present invention.

As shown in FIG. 2, the optical disc 1 according to the embodiment has a center hole and a clamping area. The center hole is formed at the center of the optical disc 1. The clamping area is formed around the center hole. In the direction from the inner periphery to the outer periphery of the disc, area PCA (Power Calibration Area), area PMA (Program Memory Area), lead-in area L1, program Area PA, and lead-out area LO are formed. The area PCA is an area for adjusting laser power radiated from the optical pickup to the optical disc 1. The area PMA is an area for temporarily storing address information necessary for a rewriting operation (namely, allowing new data to be written after the former record end position). The diameter of the optical disc 1 is 120 mm that is the same as that of CD. However, as with CD single that is CD having a diameter of 8 cm, the diameter of the optical disc 1 may be 80 mm.

Figure 3:
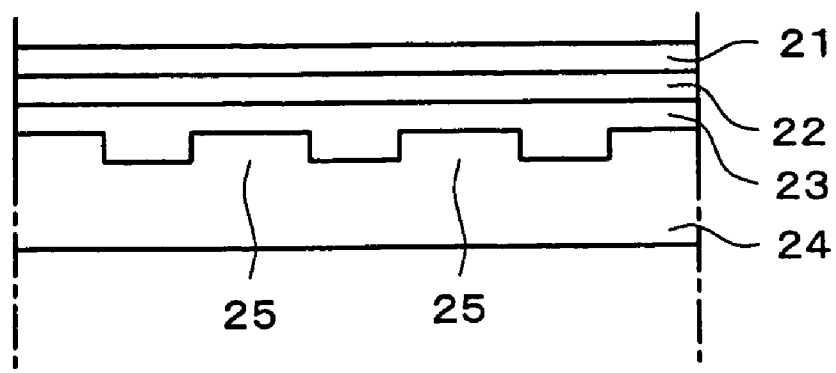
FIG. 3 is an enlarged sectional view showing the structure of an optical disc according to the embodiment of the present invention.

FIG. 3 shows the structure of the optical disc 1. FIG. 3 shows a CD-R disc as an example of the optical disc 1. Assuming that the side on which laser light is radiated from the optical pickup 3 is the lower side, a protection film 21, a reflection film 22, a record layer 23, and a substrate 24 are successively formed toward the lower side. The reflection film 22 is composed of a metal material such as Au or Ag. The record layer 23 is composed of an organic coloring matter. The substrate 24 is composed of a synthetic resin having light permeability. An example of the substrate 24 is polycarbonate having a pre-groove 25. Examples of the organic coloring matter used for the record layer 23 are cyanine type coloring matter and phthalocyanine type coloring matter. As was described in the "Related Art" section, the pre-groove 25 is wobbled in the radius direction of the disc 1 so as to record address information (position information). When light energy of laser light radiated from the optical pickup 3 is focused on the pre-groove 25 (in other words, when the laser light is focused by an object lens of the optical pickup 3), a deformed portion (pits) is formed at the interface between a part of a heated and solved organic coloring matter of the record layer 23 and the substrate 24 that is softened by the heat of the radiated laser light. As a result, data is recorded in the pre-groove 25 of the optical disc 1. When laser light that is lower than laser light in the record mode is radiated from the optical pickup 3 to the optical disc 1 and the difference between the amount of light radiated by the optical pickup 3 and the amount of light reflected by the optical disc 1 is detected by the optical pickup 3, data can be reproduced. The optical disc 1 can be reproduced by a CD player and a CD-ROM reproducing apparatus as well as a CD-R recording and reproducing apparatus.

Figure 4:
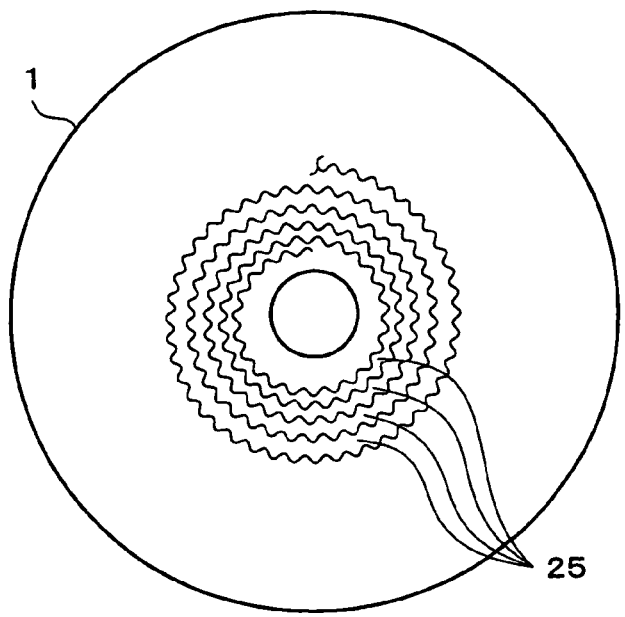
FIG. 4 is a schematic diagram showing a wobbling groove according to the embodiment of the present invention.
Figure 5:
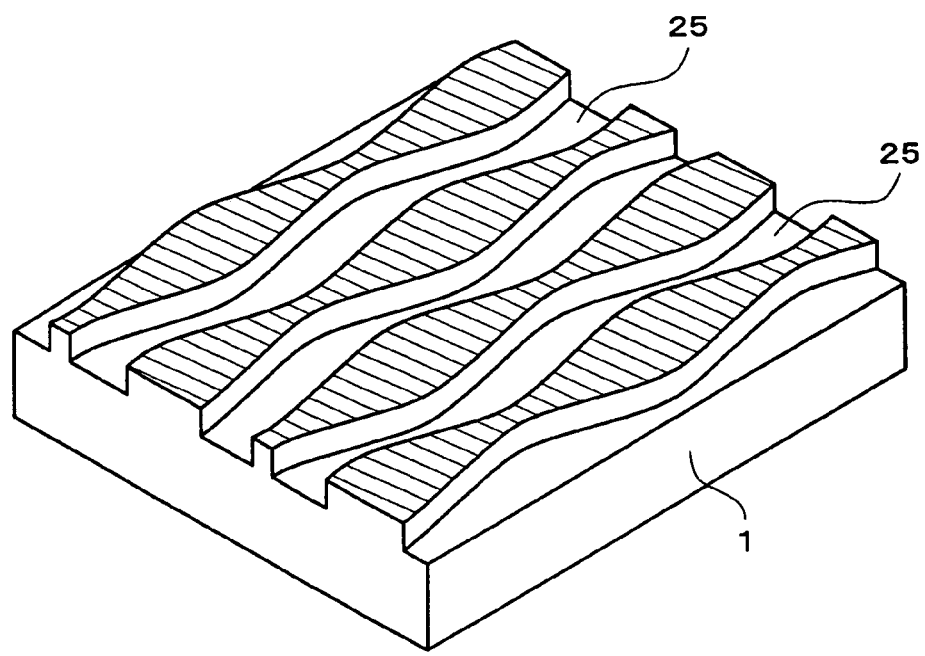
FIG. 5 is an enlarged schematic diagram showing a wobbling groove according to the embodiment of the present invention.

As shown in FIGS. 4 and 5, the pre-groove 25 is spirally and successively formed from the area PCA to the lead-out area LO (on the entire disc surface from the inner periphery to the outer periphery). The pre-groove 25 is wobbled for controlling the rotation of the disc and as a record reference signal. As was described above, data is recorded in the pre-groove 25 or between the pre-groove 25 and a land thereof. As wobble information of the pre-groove 25, address information is successively recorded. With reference to address information obtained by the wobble information, the optical pickup 3 is moved to a desired write position of the optical disc 1. Data is written to the desired position of the optical disc 1.

Returning to FIG. 1, data is supplied from a host computer 10 as an external device to the drive through an interface 9 (for example, SCSI (Small Computer System Interface)). An encoder/decoder 5 is connected to the interface 9. A buffer memory 6 is connected to the encoder/decoder 5. The buffer memory 6 stores write data or read data.

Write data is supplied to the encoder/decoder 5 through the interface 9. In the record mode, the encoder/decoder 5 generates data in the CD-ROM format. Thereafter, data in the CD format is EFM-modulated and encoded by an error correction code encoding process. In the reproduction mode, the encoder/decoder 5 performs a decoding process for an RF signal supplied from an RF signal processing portion 11 (that will be described later). Digital data as the result of the decoding process is output to the host computer 10 through the interface 9. Besides ATIP, the encoder/decoder 5 adds address data as sub code to the record data. In addition, the encoder/decoder 5 adds address data to the header of data generated in the CD-ROM format. Such address data represent addresses as with ATIP.

Record data is supplied from the encoder/decoder 5 to a laser driver 8 through a record compensator (record equalizer) 7. The record compensator 7 performs a nonlinear process for record data so that recorded pits become the same as those of CD. The compensation amount of the record compensator 7 is adjusted depending on the characteristic of the record layer of the optical disc 1, the shape of the record laser beam, and so forth. Information that represents the optimum power of the optical disc 1 is recorded in ATIP. In addition, to obtain the real optimum writing power of the optical disc 1 (namely, the output level of laser light radiated from the optical pickup 3), using the PCA area, a test write operation is performed. As a result of the test write operation, the optimum write power can be obtained. After the optimum power has been set, data is written to the optical disc 1.

The laser driver 8 drives a semiconductor laser device as a light source of the optical pickup 3 corresponding to an output signal of the record compensator 7 so as to generate a drive signal having a predetermined level necessary for recording record data to the optical disc 1. The drive signal is supplied from the laser driver 8 to the semiconductor laser device of the optical pickup 3. Laser light corresponding to the record data is radiated from the semiconductor laser device. Thus, the data is recorded to the optical disc 1. As was described above, APC (Automatic Power Control) of the RF signal processing portion 11 controls the laser driver 8 so that the output level of the laser light that is output from the semiconductor laser device becomes an optimum value. An output signal of which the reflected light of the optical disc 1 is detected by the optical pickup 3 is supplied to the RF signal processing portion 11. A wobble signal obtained as a push-pull signal generated corresponding to the output signal of the optical pickup 3 is supplied from the RF signal processing portion 11 to an address extracting portion 12.

The RF signal processing portion 11 has a matrix amplifier. The matrix amplifier calculates a detected signal of a photo-detector of the optical pickup 3. As a result, besides the above-described push-pull signal, the RF signal processing portion 11 generates tracking error signal TE and focus error signal FE. The tracking error signal TE and the focus error signal FE are supplied to a servo controlling portion 14.

The address extracting portion 12 supplies a wobble signal as the push-pull signal supplied from the RF signal processing portion 11 to an FM demodulator through a band pass filter that passes only a frequency band close to a carrier frequency (at 22.05 kHz) so as to obtain a bi-phase signal. In addition, the address extracting portion 12 uses a clock obtained from the bi-phase signal to control the spindle motor 2. In addition, the address extracting portion 12 extracts address data and control signal from the bi-phase signal with the clock. The address data and the control signal extracted by the address extracting portion 12 are supplied to a controlling portion 13 composed of a microcomputer.

The controlling portion 13 controls the seek operation using address data supplied from the address extracting portion 12. In addition, the controlling portion 13 controls the laser power of laser light radiated from the optical pickup 3 using the supplied control signal. The controlling portion 13 controls all the portions of the drive such as the interface 9, the encoder/decoder 5, the RF signal processing portion 11, and the servo controlling portion 14.

An output signal of the address extracting portion 12 is supplied to the controlling portion 13. In addition, the output signal of the address extracting portion 12 is supplied to an error checking circuit 15. As will be described later, the error checking circuit 15 detects the presence/absence of an error using lead-in start time data and/or lead-out start time data of the control signal and outputs the error detected result to the controlling portion 13.

According to the embodiment, since the optical disc 1 is a CD-R disc, various recording methods such as disc-at-once, track-at-once, packet-at-once, and multi-session can be used. In the disc-at-once method, once data recording operation for the optical disc 1 is started, until it is completed, the recording operation cannot be stopped. In the method, data is recorded in the order of the lead-in area LI, the program area_PA, and the lead-out area LO of the optical disc 1. In the track-at-once method, at first, data is recorded to the program area. Thereafter, data is recorded to the lead-out area. Finally, data is recorded to the lead-in area. In the track-at-once method, as wobble information recorded in the pre-groove 25, each track number, start time data, and end time data that are read from ATIP are recorded. After all data is recorded to tracks, lead-out area is recorded. In addition, corresponding to information that is read from the PMA area, TOC information is created. The TOC information is recorded to the lead-in area. In the packet-at-once method, a small amount of data is repeatedly rewritten. In the multi-session method, data is recorded in such a manner that a plurality of sessions are formed in the radius direction of the optical disc 1. Data is recorded in such a manner that each session has a lead-in area and a lead-out area.

In addition, when the optical disc 1 is reproduced, the RF signal processing portion 11 outputs an RF signal. The RF signal is supplied to the encoder/decoder 5. The encoder/decoder 5 performs an EFM-demodulating process and a decoding process in CD format such as error correction code decoding process. Thereafter, the encoder/decoder 5 performs a decoding process in CD-ROM format. Reproduced data that is output from the encoder/decoder 5 is stored to the buffer memory 6. When the encoder/decoder 5 receives a read command from the host computer 10, the encoder/decoder 5 transfers the reproduced data stored in the buffer memory 6 to the host computer 10 through the interface 9.

A frame synchronous signal, tracking error signal TE, and focus error signal FE that are output from the RF signal processing portion 11 and clock that is output from the address extracting portion 12 are supplied to the servo controlling portion 14. The servo controlling portion 14 performs a tracking servo and a focus servo for the optical pickup 3, a spindle servo for the spindle motor 2, and a thread servo for the feed motor 4.

As was described above, on the optical disc 1, the pre-groove 25 is wobbled by FM (FSK) modulation with a carrier of 22.05 kHz±1 kHz. When the FM-modulated wobbling of the pre-groove 25 is demodulated from the generated push-pull signal corresponding to the output signal of the optical pickup 3, a bi-phase signal with a clock of 6.3 kHz is obtained. When the obtained bi-phase signal is demodulated, data of 3150 bits/sec can be obtained. As was described above, since one second is equivalent to 75 frames, one frame of ATIP data as address data is composed of 42 bits.

Figure 6:
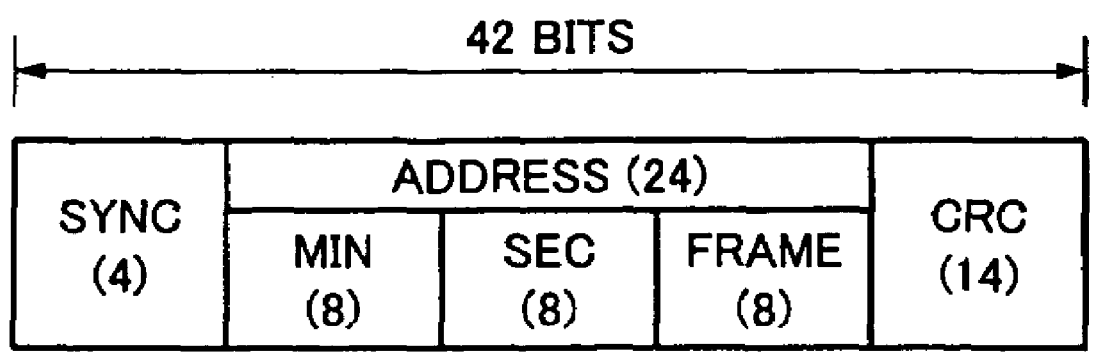
FIG. 6 is a schematic diagram showing an address format according to the embodiment of the present invention.

FIG. 6 shows the structure of data of one frame of ATIP data as address data of the optical disc 1. The first four bits are a synchronous signal. The next 24 bits are an address description portion. The last 14 bits are CRC (Cyclic Redundancy Code). The synchronous signal has a special pattern that does not take place in a by-phase mark. The decimal numerals of minutes, seconds, and frames of address data (time information) are denoted by eight bits each in BCD. Thus, addresses of up to 99 minutes, 59 seconds, 74 frames can be represented. Assuming that the data amount of one frame is 2 kbytes, the address data is equivalent to around 900 Mbytes.

In the format of the optical disc 1 (CD-R), in a combination of high order four bits of each of M for "minutes", S for "seconds", and F for "frames" (actually, those bits are not used (namely, all 0s), information other than addresses is represented (the information is referred to as extra information). With respect to the most significant bit of M for "minutes", when M is "99 minutes", the most significant bit thereof becomes "1". However, actually, so far, the record durations of discs that are commercially available are up to 80 minutes. Thus, the most significant bit of M for "minutes" does not become "1". Extra information other than addresses is recorded to the lead-in area LI. In the program area PA and the lead-out area LO, only address data is recorded.

FIG. 7 shows contents of information in combinations of three bits M1, S1, and F1 that are the most significant bits of M for minutes, S for seconds, and F for frames. In other words, (M1, S1, F1=000) represents the addresses of the program area PA and the lead-out area LO. The most significant bits M1, S1, and F1 and the addresses (M, S, F) of the program area PA and the lead-out area LO are combined. (M1, S1, F1=100) represents the addresses of the area PCA, the area PMA, and the lead-in area. (M1, S1, F1=101) represents special information 1 (record power at reference speed, application code, and disc type ID). (M1, S1, F1=110) represents special information 2 (lead-in start time). (M1, S1, F1=111) represents special information 3 (lead-out start time). In addition, as shown in FIG. 7, although additional information 1, additional information 2, and additional information 3 have been reserved, they have been not yet defined. Special information is represented by M1="1", whereas additional information 1 to 3 are represented by extra information other than addresses.

In the optical disc 1 (CD-R), the sequence of successive frames of the lead-in area LI is defined as shown in FIG. 8. As is clear from FIG. 8, a sequence of 30 frames is defined. At frame numbers N, N+10, N+20, . . . (at intervals of 10 frames), special information 1, special information 2, and special information 3 are placed. At other frame numbers, regular addresses are placed.

Next, addresses represented by time information of minutes, seconds, and frames will be described in reality. Time information of each of the program area PA and the lead-out area LO starts at 00 minute, 00 second, 00 frame and increments. In the lead-in area L1, time information exceeding 90 minutes is recorded. After 99 minutes, 59 seconds, 74 frames, time information becomes 00 minute, 00 second, 00 frame at which the program area PA starts.

The standard of CD-R disc as an example of the optical disc 1 is defined in "Orange Book" that is a standard document. In the range that satisfies the standard of the Orange Book, the start position of the lead-in area has a margin to some extent. FIG. 9 shows the margin of the start position of the lead-in area LI. In the format of which the disc reproduction duration or disc record duration of the optical disc 1 is 64 minutes (linear velocity=1.4 m/sec constant), as was described above, the minimum length of the lead-in area LI is (02, 07, 48) and the maximum length of the lead-in area L1 is (02, 14, 06) in (M, S, F) notation. Thus, the lead-in start time can be selected from a value that satisfies the standard of the above-described Orange Book—namely, in the range from (97, 45, 69) to (97, 52, 27).

Likewise, in the format of which the disc reproduction duration or disc record duration of the optical disc 1 is 74 minutes (linear velocity=1.2 m/sec constant), the minimum length of the lead-in area LI is (02, 28, 68) and the maximum length of the lead-in area LI is (02, 36, 32) in (M, S, F) notation. Thus, the lead-in start time can be selected from a value that satisfies the standard of the above-described Orange Book—namely, in the range from (97, 23, 43) to (97, 31, 07).

According to the embodiment of the present invention, using the margin of the lead-in start time, it is encoded so that an error thereof can be detected by itself. The error checking circuit 15 (see FIG. 1) detects whether or not there is an error of lead-in start time. For example, error detection encoding using CRCC (Cyclic Redundancy Check Code) is used. In this case, assuming that with generation polynomial g (x)=$x^4$+x+1 and time information of lead-in start time T (x)= [M, S, F] (24 bits, polynomial of 23-rd order of x), the low order four bits of the frame F are selected so that T (x) is can be exactly divided by g (x) (remainder="0").

When the above-described error detectable encoding is performed, the error checking circuit 15 divides the lead-in start time by generation polynomial g (x) and determines whether or not the remainder is 0 so as to detect an error of lead-in start time. In the example of g (x), values of which the remainder is 0 are 0 to F (in hexadecimal notation). However, BCD notation does not represent values A to F. Thus, the selection of the low order four bits of the frame F is restricted. To solve the problem, a rule of which when the value becomes one of A to F, "6" is added to the value is pre-adopted. As a result, values A to F in hexadecimal notation can be converted into values 0 to 5, respectively.

As another method, besides the above-described generation polynomial, with generation polynomial g (x)=$x^3$+x+1, the low order three bits of the frame F are selected so that the remainder of which the lead in start time is divided by g (x) becomes 0. Thus, values A to F in hexadecimal notation can be selected from values 0 to 7.

As a second example of which the error detectable encoding by the error checking circuit 15, the digits (8 bits) of the frame F are selected so that when each digit of M, S, and F of the lead-in start time is added with (modulo 75), the added result becomes "0". (modulo 75) is used because the digits of the frames range from values 00 to 74. In reality, now assume that lead-in start time is 97 minutes, 24 seconds, Q frames where Q is a symbol that represents an undetermined value. In the example, the following formula is satisfied.

$$97+24+Q=0 \text{ (modulo 75)} \tag{1}$$

The value that satisfies the formula (1) is (Q=29). Thus, the digits of the frames become (29 frames). The error checking circuit 15 performs an addition of the above-described formula with (modulo 75) and determines whether or not the added result is "0" so as to check whether or not there is an error in the lead-in start time.

As a third example of the error detectable encoding by the error checking circuit 15, the low order four bit of the frame F are selected so that when each digit of M, S, and F of the lead-in start time is added with (modulo 10), the added result becomes 0. In reality, assuming that the lead-in start time is 97 minutes, 24 seconds, 10 frames, the value of the low order four bits is decided using the following formula.

$$9+7+2+4+1+Q=0 \text{ (modulo 10)} \quad (2)$$

The value that satisfies the formula (2) is (Q=7). Thus, the digits of the frames become (17 frames). The error checking circuit 15 performs the addition of the above formula with (modulo 10) and determines whether or not the added result is 0 so as to check whether or not there is an error in the lead-in start time.

Since (modulo 10) is used, as a value of the low order four bits of the digits of the frames, one of 0 to 9 can be selected. This is well harmonized with code assignments for distinguishing disc manufacturers of OSJ (Orange book study of Japan) for CD-R discs. FIG. 10 shows an example of lead-in start time code assignments for manufactures (A, B, C, D, E, F, ..., G, H, ..., I) according to OSJ. "1st code" of FIG. 10 is applied to a format of which the disc reproduction duration is 74 minutes, whereas "2nd code" is applied to a format of which the disc reproduction duration is 64 minutes. The manufacturer distinguished result is used to control the output level of a laser beam in the record mode of a CD-R disc as the optical disc 1.

In FIG. 10, as 1st code, (97 minutes, 24 seconds, 10 frames to 97 minutes, 24 seconds, 19 frames) are assigned to for example manufacturer E. Likewise, a value in the range of (0 to 9) as the low order four bits of the frames is assigned to each manufacturer. Thus, in the error detection encoding by the addition with (modulo 10), one of values (0 to 9) is selected. Consequently, the error detection encoding is well harmonized with the code assignments shown in FIG. 10.

In addition, in the code assignments of OSJ, (00 to 04) are assigned cyanine as organic coloring matter used in the record layer 23, whereas (05 to 09) are assigned phthalocyanine as organic coloring matter used in the record layer 23. To satisfy the code assignments of OSJ, instead of an adding expression with (modulo 75) or an adding expression with (modulo 10), an adding expression with (modulo 5).

As a fourth example of the error detectable encoding by the error checking circuit 15, error detecting encoding is performed for lead-out start time recorded in the lead-in area LI as special information 3. When the lead-out start time is 17 minutes, 50 seconds, Q frames, as with the second example, the value Q of the frames is selected so that the added result of the following formula with (modulo 75) becomes "0".

$$17+50+Q=0 \text{ (modulo 75)} \quad (3)$$

The value of the frames that satisfies the formula (3) is (Q=08). Thus, time information of 17 minutes, 50 seconds, 08 frames is recorded as the lead-out start time. Of course, the lead-out start time is a value that cannot exceed a value defined in the CD-R physical standard or the like. The program error PA depends on the value of the lead-out start time. As a result, the record capacity may slightly decreases depending on the value of the lead-out start time. However, since the lead-out start time is not affected by manufacturer code of OSJ and category code of organic coloring matter used for the record layer 23, it can be said that the flexibility of the lead-out start time is high.

As a fifth example of the error detectable encoding by the error checking circuit 15, both lead-in start time and lead-out start time are used. When the lead-in start time is 97 minutes, 24 seconds, 10 frames and the lead-out start time is 17 minutes, 50 seconds, Q frames, the value Q of the frames is selected so that the added result of the following formula with (modulo 75) becomes "0".

$$97+24+10+17+50+Q=0 \text{ (modulo 75)} \quad (4)$$

The value of the frames of the lead-out start time that satisfies the formula (4) is (Q=27). To detect an error, it is determined whether or not the added result of both the lead-in start time and the lead-out start time that are read from the optical disc with (modulo 75) is "0".

Next, a sixth example of the error detection encoding by the error checking circuit 15 will be described. In the sixth example, in addition to lead-in start time and/or lead-out start time, constant K that the drive (recorder or player) side has is used. Assuming that the lead-in start time is 97 minutes, 24 seconds, 10 frames, the lead-out end time is 20 minutes, 15 seconds, 34 frames, and K=25, the added result of the following expression becomes 225.

$$97+24+10+20+15+34+25=225$$

In other words, the value of the digits of the frames of the lead-out start time is selected. If the added result does not become 225 with only the value of digits of the frames, the value of digits of the seconds are used. When the lead-out start time is read, it is determined whether or not the added result is 225 so as to detect whether there is an error in the lead-out start time. The value "255" as the added result becomes 0 in an addition with (modulo 75). As with the above-described example, the addition with (modulo 75) can be used. (modulo 75) represents that the added result can be exactly divided. Thus, it is different from the case that the added result is "225".

Alternatively, two or more types of error detection encoding for address information such as lead-in start time can be used instead of one type of error detection encoding. For example, with an adding expression with (modulo 10) and an adding expression with (modulo 75), two types of address information of which the added result becomes "0" can be generated. As constant K that the drive side has, with two types of constants K1 and K2, two types of address information can be generated.

Moreover, in the above-described examples, all digits or bits of address information such as lead-in start time are used. However, error detection encoding can be performed by omitting a part of address information (namely, the value of a lower digit of the frames of time information). In reality, in an example using lead-in start time and lead-out start time, assuming that the value of a lower digit of the frames of the lead-in start time is always "0", the error detection encoding can be performed.

Next, a seventh example of the error detection encoding by the error checking circuit 15 will be described. In the seventh example, each digit of M, S, and F of lead-in start time is independently handled. Each digit is multiplied by a predetermined coefficient. In other words, lead-in start time is represented by two digits in BCD notation. The minutes (M) of the lead-in start time are represented by numerals (M$1_i$, M$2_i$) of two digits. The minutes (S) of the lead-in start time are represented by numerals (S$1_i$, S$2_i$) of two digits. The frames (F) of the lead-in start time are represented by numerals (F$1_i$, F$2_i$) of two digits. As expressed by the following formula, each digit of M, S, and F of the lead-in start time is independently handled. Each digit is multiplied by a predetermined coefficient and then added each other. $F2_i$ is decided so that the calculated result with modulo z becomes "0".

$$a \times M1_i + b \times M2_i + c \times S1_i + d \times S2_i + e \times F1_i + f \times F2_i \equiv 0 \text{ (modulo } z\text{)} \quad (6)$$

In this case, coefficients a to f may be the same or different from each other. Alternatively, some of coefficients a to f may be the same. It may be considered that the second and third examples are special examples of expressions by the above-described formulas (1) and (2). In other words, it can be considered that the second example is an example of which in the formula (6), the coefficient a is "10", the coefficient b is "1", the coefficient c is "10", the coefficient d is "1", the coefficient e is "10", the coefficient f is "1", and the coefficient z is "75". Likewise, it can be considered that the third example is an example of which all the coefficients a to f are "1" and the coefficient z is "10".

An eighth example of the error detection encoding by the error checking circuit 15 is an example of which each digit of M, S, and F of the lead-out start time is independently handled and each digit is multiplied by a predetermined coefficient. In other words, the lead-out start time is represented by two digits in BCD notation. The minutes of the lead-out start time are represented by numerals ($M1_o$, $M2_o$) of two digits. The seconds of the lead-out start time are represented by numerals ($S1_o$, $S2_o$) of two digits. The frames of the lead-out start time are represented by numerals ($F1_o$, $F2_o$) of two digits. As expressed by the following formula, each digit of M, S, and F of the lead-out start time is independently handled. Each digit is multiplied by a predetermined coefficient. $F2_o$ is decided so that the added result with modulo z becomes "0".

$$g \times M1_o + h \times M2_o + i \times S1_o + j \times S2_o + k \times F1_o + l \times F2_o \equiv 0 \text{ (modulo } z\text{)} \quad (7)$$

Both lead-in start time and lead-out start time may be used. In this case, the minutes of the lead-in start time are represented by numerals ($M1_i$, $M2_i$) of two digits. The seconds of the lead-in start time are represented by numerals ($S1_i$, $S2_i$) of two digits. The frames of the lead-in start time are represented by numerals ($F1_i$, $F2_i$) of two digits. The minutes of the lead-out start time are represented by numerals ($M1_o$, $M2_o$) of two digits. The seconds of the lead-out start time are represented by numerals ($S1_o$, $S2_o$) of two digits. The frames of the lead-out start time are represented by numerals ($F1_o$, $F2_o$) of two digits. As expressed by the following formula, each digit of M, S, and F of the lead-in start time and each digit of M, S, and F of the lead-out start time are independently handled. Each digit is multiplied by a predetermined coefficient and then added each other. $F2_i$ and $F2_o$ are decided so that the added result with modulo z becomes "0".

$$a \times M1_i + b \times M2_i + c \times S1_i + d \times S2_i + e \times F1i + f \times F2i + g \times M1_o + h \times M2_o + i \times S1_o + j \times S2_o + k \times F1_o + l \times F2_o \equiv 0 \text{ (modulo } z\text{)} \quad (8)$$

According to the embodiment of the present invention, the detected result of the error checking circuit 15 is supplied to the controlling portion 13. The controlling portion 13 controls the recording operation or the reproducing operation of the drive corresponding to the detected result of the error checking circuit 15. The controlling portion 13 can control such operations in several manners.

In the record mode, the optical pickup 3 reads the lead-in area LI of the loaded optical disc 1. In addition to the regular operation of the CD-R drive, the error checking circuit 15 checks an error using address information or using both address information and constant K. When the determined result of the error checking circuit 15 represents that the address information has an error, the controlling portion 13 prohibits data from being recorded to the program area PA of the optical disc 1. In contrast, when the determined result of the error checking circuit 15 represents that the address information does not have an error, the controlling portion 13 permits data to be recorded to the program area PA of the optical disc 1. When the controlling portion 13 prohibits data from being recorded to the program area PA of the optical disc 1, the controlling portion 13 causes a display 16 of the drive to display a message that represents that data cannot be recorded because an error has been detected. In other words, only when the address information does not have an error, data can be recorded to the optical disc 1.

Likewise, in the reproduction mode, an error of the loaded disc 1 is checked in the same manner as the record mode. When the determined result of the error checking circuit 15 represents that address information that is read from the lead-in area LI of the loaded optical disc has an error, the error checking circuit 15 prohibits data recorded on the optical disc 1 from being reproduced therefrom. In contrast, when the determined result of the error checking circuit 15 represents that the address information does not have an error, the controlling portion 13 controls the optical pickup 3 so as to permit data recorded on the optical disc 1 to be reproduced. In other words, only when the address information that is read from the optical disc 1 does not have an error, data recorded in the program area PA of the optical disc 1 can be reproduced. When the reproduction of the optical disc 1 is prohibited because an error has been detected from the address information that has been read from the optical disc 1, an error message is displayed on the display 16 of the drive. As was described above, when an error has been detected in address information, in addition to the record/reproduction prohibiting process of the loaded optical disc 1, the loaded optical disc 1 may be forcedly unloaded from the drive. At that point, an error message may be displayed on the display 16.

As the optical disc 1, a recordable optical disc (for example, CD-R disc) may be recorded and reproduced by different recording and/or reproducing apparatuses. Knowing that cheap CD-R discs that are commercially available tend to have a problem, some users may want to use such discs. From this point of view, a recording and reproducing apparatus that can record and reproduce data to/from a CD-R disc may have different operations against an error in the record mode and the reproduction mode.

As an example of the operations in the record and reproduction modes, when an error is detected in lead-in start time or the like (for example, address information of lead-in start time, address information of lead-out start time, address information of lead-in start time and lead-out start time, or address information of address information that represents the position of particular data recorded in the program area PA), although data is prohibited from being recorded to the loaded optical disc, data is permitted to be reproduced from the loaded optical disc. In other words, there is a situation that although an error has taken place in address information that has been read, data has been recorded on the loaded optical disc by another apparatus. When an error is detected in the above-described manner, if data is prohibited from being reproduced from the loaded optical disc, although the data has been recorded on the disc, the data cannot be reproduced at all. To solve such a problem, when an error is detected in address information such as lead-in start time, data is prohibited from being recorded to the loaded optical disc. However, data is permitted to be reproduced from the loaded optical disc. Those recording and reproducing operations are controlled by the controlling portion that controls the operations of the recording and reproducing apparatus. In the following examples, the operations of the recording and reproducing apparatus are controlled by the controlling portion of the apparatus.

As another example of the operations in the record and reproduction modes, when an error is detected in address information such as lead-in start time of a loaded optical disc, data is prohibited from being recorded to the loaded optical disc. In addition, when data is reproduced from the loaded optical disc, an error message is displayed on the display of the apparatus so as to alarm the user for a high possibility of an occurrence of an error. However, data is permitted to be reproduced from the loaded optical disc. For example, when data is recorded to the loaded optical disc, if an error is detected in address information such as lead-in start time, an error message "This disc has a risk of an occurrence of an error." may be displayed on the display of the apparatus. An alarm sound may be generated. A lamp or the like may be lit. In such a manner, the user is alarmed of an occurrence of an error. In addition, data is prohibited from being recorded to the loaded optical disc. When an error message is displayed on the display or the like in such a manner, the user can know why data cannot be recorded to the optical disc.

As another example of the operations in the record and reproduction modes, if an error is detected in address information such as lead-in start time of a loaded optical disc, when data is recorded and reproduced to/from the loaded optical disc, the user is alarmed of the error. However, data is permitted to be recorded and reproduced to/from the loaded optical disc. For example, knowing that cheap optical discs that are commercially available tend to have an error in the record mode and reproduction mode, some users may want to use such discs. For such users, when an error is detected in address information of the loaded optical disc, an error message "This is not a recommended disc." may be displayed on the displaying portion of the apparatus such as display. Alternatively, an alarm sound may be generated. Alternatively, a lamp or the like may be lit. Thus, before the recording operation or the reproducing operation is performed after the optical disc has been loaded, the users are alarmed. However, data is permitted to be recorded and reproduced. Thus, such users can use cheap discs that are commercially available even if they have a risk of an occurrence of an error.

As another example of the operations in the record and reproduction modes, when an error is detected in address information such as lead-in start time that is read from a loaded optical disc, in the record mode, the user is alarmed in such a manner. However, data is permitted to be recorded to the loaded optical disc. In addition, data is permitted to be reproduced from the loaded optical disc. In this case, knowing that cheap discs that are commercially available tend to have a problem of an error in the record mode or the reproduction mode, users can use them. In this example, when data is reproduced from the loaded disc, since an error message is not displayed on the displaying portion such as the display of the apparatus, the users can be prevented from unnecessary getting confused.

In addition to the detection of an error of address information such as lead-in start time that is read from the optical disc 1, the loaded optical disc 1 can be distinguished. In other words, even if address information can be correctly read from the loaded optical disc 1, when the error detected result corresponding to the error detection code of the address information that is read from the loaded optical disc 1 does not satisfy a non-error condition, it is determined that the address information that is read from the loaded optical disc 1 has an error. In other words, it is determined that an optical disc whose address information has an error is not a desired disc. As a result, corresponding to the address information that is read, the loaded disc can be distinguished.

In other words, for an optical disc 1 suitable for the recording and reproducing apparatus, address information such as lead-in start time is pre-recorded on the optical disc 1 so that a value calculated corresponding to one of the formulas (1) to (8) becomes a predetermined value. After an optical disc is loaded to the recording and reproducing apparatus, it reads address information such as lead-in start time from the loaded optical disc with the optical pickup 3, calculates the address information that has been read, and determines whether or not the loaded optical disc is a disc suitable for the apparatus corresponding to the calculated result (namely, depending on whether or not the address information has an error). When the determined result represents that the loaded optical disc is an optical disc suitable for the apparatus, data is permitted to be recorded to the program area PA of the loaded optical disc 1. In contrast, when the determined result represents that the loaded optical disc is not an optical disc suitable for the apparatus, data is prohibited from being recorded to the loaded optical disc. At that point, when the loaded optical disc is not an optical disc suitable for the apparatus, an alarm message such as "This is not a recommended disc. Carefully use it." may be displayed on the displaying portion such as the display 16 of the drive. Alternatively, an alarm sound may be generated. Alternatively, a lamp or the like may be lit. As a result, the user is alarmed.

Likewise, when an optical disc is loaded to the apparatus, address information such as lead-in start time is read from the loaded optical disc. The address information that has been read from the loaded optical disc is calculated corresponding to one of the above-described formulas (1) to (8) so as to determine whether or not the loaded optical disc is a disc suitable for the apparatus. When the determined result represents that the loaded optical disc is an optical disc suitable for the apparatus, data is permitted to be reproduced from the loaded optical disc. In contrast, when the determined result represents that the loaded optical disc is not an optical disc suitable for the apparatus, data is prohibited from being reproduced from the loaded optical disc. At that point, when the determined result represents that the loaded optical disc is not an optical disc suitable for the apparatus, an alarm message such as "This is not a recommended disc. Carefully use it." may be displayed on the displaying portion such as the display 16 of the drive. Alternatively, an alarm sound may be generated. Alternatively, a lamp or the like may be lit. As a result, the user is alarmed.

As the optical disc 1, a recordable optical disc (for example, CD-R disc) may be recorded and reproduced by different recording and reproducing apparatuses. Knowing that cheap discs that are commercially available may not be suitable for the apparatus some uses may want to use them. From this point of view, when the determined result represents that the loaded optical disc is not a disc suitable for the recording and reproducing apparatus that records and reproduces data to/from a CD-R disc, the apparatus may perform different operations in the record mode and the reproduction mode.

As an example of the operations in the record mode and reproduction mode in the case that the determined result represents that the loaded optical disc is not a disc suitable for the apparatus, when the determined result corresponding to lead-in start time or the like (for example, address information of lead-in start time, address information of lead-out start time, address information of lead-in start time and lead-out start time, or address information of address information that represents the position of particular data recorded in the program area) represents that the loaded optical disc is not an optical disc suitable for the apparatus, data is prohibited from being recorded to the program area of the loaded optical disc. However, data is permitted to be reproduced from the loaded optical disc. In other words, even if the loaded optical disc is not an optical disc suitable for the apparatus, data may have been recorded thereto by another apparatus. Thus, if data is prohibited from being recorded to the optical disc that is not suitable for a desired apparatus, the data should be reproduced by the original apparatus. Thus, the operability deteriorates. Thus, when the determined result corresponding to address information such as lead-in start time represents that the loaded optical disc is not an optical disc that is suitable for the apparatus, new data is prohibited from being recorded to the loaded optical disc. Instead, data is permitted to be reproduced from the loaded optical disc.

As another example in the case that the determined result represents that the loaded optical disc is not an optical disc suitable for the apparatus, when the determined result corresponding to address information such as lead-in start time read from the loaded optical disc represents that the loaded optical disc is not an optical disc suitable for the apparatus, data is prohibited from being recorded to the loaded optical disc. In addition, when data is reproduced from the loaded optical disc, an error message is displayed on the displaying portion or the like of the apparatus. The user is alarmed of a message that represents that the loaded optical disc is likely not to be used. However, data is permitted to be reproduced. For example, in the record mode, when the determined result corresponding to address information of lead-in start time or the like that is read from the loaded optical disc represents that the loaded optical disc is not a disc that is suitable for the apparatus, an alarm message such as "This is not a recommended disc. Carefully use it." may be displayed on the displaying portion or the like of the apparatus. Alternatively, an alarm sound may be generated. Alternatively, a lamp or the like may be lit. As a result, the user is alarmed. In addition, data is prohibited from being recoded to the loaded optical disc. When such an error message is displayed, the user can know the reason why data cannot be recorded to the loaded disc.

As another example in the case that the determined result represents that the loaded optical disc is not an optical disc suitable for the apparatus, when the determined result corresponding to address information such as lead-in start time or the like represents that the loaded optical disc is not an optical disc suitable for the apparatus, both in the record mode and the reproduction mode, the user is alarmed. However, data is permitted to be recorded to the loaded optical disc and reproduced therefrom. For example, knowing that cheap discs that are commercially available tend to have a problem of an error in the record mode and the reproduction mode, some users may want to use them. In this case, when an optical disc that is not suitable for the apparatus is loaded thereto, corresponding to address information that is read from the loaded optical disc, an alarm message such as "This is not a recommended disc. Carefully use it." may be displayed on the displaying portion or the like of the apparatus. Alternatively, an alarm sound may be generated. Alternatively, a lamp or the like may be lit. As a result, the user is alarmed. However, data is permitted to be record to the loaded optical disc and reproduced therefrom. Thus, such users can use cheap discs with knowing such a risk.

As another example in the case that the determined result represents that the loaded optical unit is not an optical disc suitable for the apparatus, when the determined result corresponding to address information such as lead-in start time or the like that is read from the loaded optical disc represents that the loaded optical disc is not a disc suitable for the apparatus, in the record mode, the user is alarmed in the above-described manner. However, data is permitted to be recorded to the loaded optical disc. In addition, data is permitted to be reproduced from the loaded optical disc. In this case, knowing that cheap discs that are commercially available have a problem of an error, some users may use them. When data is reproduced from the loaded optical disc, since an error message is not displayed, the user is prevented from unnecessarily getting confused.

In addition, depending on the type of the optical disc loaded to the apparatus, electric characteristics such as servo characteristic, mechanical characteristics, or optical characteristics may be varied and optimized. As was described above, the detection of an error of address information according to the present invention can be used for distinguishing one of a plurality of types of discs. With the distinguished result of the disc corresponding to an error detected from the address information, if the disc has a problem, the electric characteristics of the servo mechanism, mechanical characteristics, or optical characteristics of the apparatus can be varied so as to handle the loaded optical disc.

Generally, in addition to base specifications, the above-described standard for CD-R disc and so forth defines some tolerances for various reference values such as amount of eccentricity and track pitch so as to absorb manufacturing errors and so forth of discs. On the other hand, a particular application for CD-R disc requires specifications that are stricter than the tolerances for amount of eccentricity and track pitch. For example, a portable audio recording and reproducing apparatus and a portable video photographing, recording, and reproducing apparatus should consider the influence of vibrations and so forth. Thus, in this case, a recordable optical disc as a recording medium (namely, a CD-R disc) may require specifications closer to the reference values. The error detection of address information according to the present invention can be applied for distinguishing an optical disc that satisfies the requirements of a portable audio recording and reproducing apparatus and a portable video photographing, recording, and reproducing apparatus from others.

Depending on various applications such as a portable audio recording and reproducing apparatus, a portable video photographing apparatus, and a conventional computer drive, various types of CD-R discs as recordable optical discs that differ in reference values of amount of eccentricity and track pitch, and materials may be provided. In such a case, when a portable video photographing apparatus uses an optical disc (CD-R disc) that is not suitable for the apparatus, a problem will take place. However, a portable audio recording and reproducing apparatus can use both an optical disc suitable for the apparatus and an optical disc suitable for a portable video photographing apparatus without a problem. In addition, a conventional computer drive can use all an optical disc suitable for a portable audio recording and reproducing apparatus, an optical disc suitable for a portable video photographing apparatus, and an optical disc suitable for a conventional computer drive without a problem. Thus, combinations of apparatuses and disc types suitable therefor may become complicated. However, the optical disc distinguishing method according to the present invention allows an optical disc that is not suitable for the apparatus to be distinguished from many types of discs.

The present invention is not limited to the above-described embodiment. Various other changes, omissions, and additions in the form and detail thereof may be made therein without departing from the spirit and scope of the present invention. For example, instead of addresses of start positions of lead-in area and lead-out area, addresses of end positions and address information that define their lengths (widths) can be used. In addition, as well as addresses that define positions of lead-in and lead-out, addresses that define positions of particular data recorded in the program area may be used. For example, in lead-in area of CD or CD-ROM, as TOC (Table Of Contents), absolute times at which individual movements start are recorded. Thus, as was described above, error detection encoding can be performed for an absolute time at which the first movement starts (namely, the position two or three seconds after the start position of the program area).

As well as the above-described CD-R disc, the present invention can be applied to CD-RW disc on which almost the same information as CD-R is recorded corresponding to ATIP. In addition, as well as recordable discs, the present invention can be applied to read-only discs such as CD disc and CD-ROW disc. In addition, in the case of CD-R disc and CD-RW disc, the present invention can be applied to recorded address data without pre-recorded address information such as ATIP.

In addition, the present invention can be applied to address information in binary notation rather than time information in BCD notation (minutes, seconds, frames). For example, the first example of the error detection encoding using CRCC can be applied to addresses in binary notation. Binary notation can represent more addresses than BCD notation with the same number of bits. In addition, according to the present invention, address information is encoded so that an error of address information such as lead-in start time or the like can be detected by itself. Thus, the reliability of the address information can be improved. For example, when the error resistance against lead-in start time is improved, the data can be stably recorded and reproduced. In addition, according to the present invention, new parity is not required. Thus, the present invention can be applied to recording mediums that have been standardized for signal format and so forth. In addition, according to the present invention, since the error detected result is used to distinguish mediums, the recording/reproducing apparatus can use only a suitable medium. In this case, by performing a plurality of types of error detection encoding, a plurality of types of mediums can be distinguished.

According to the present invention, address information such as lead-in start time is encoded so that a disc can be distinguished. Thus, after it is determined whether or not a disc is a suitable disc, data can be recorded/reproduced.

INDUSTRIAL UTILIZATION

The present invention is suitable for recording mediums such as CD-R disc and CD-RW discs, a data recording method and apparatus for recording and reproducing data to/from CD-R disc and CD-RW disc, a data reproducing method and apparatus, and a data recoding and reproducing method and apparatus.

The invention claimed is:

1. A method of determining suitability of a recording medium for being recorded to and/or reproduced from by a given apparatus, the method comprising:
reading address information from the recording medium, the recording medium having at least a first area in which data is recordable, a second area, and a third area, the second area being followed by the first area, the first area being followed by the third area, the address information being at least one of first address information and second address information, the first address information representing the position of the second area, the second address information representing the position of the third area;
detecting a possible error in the address information based on a result generated using at least a portion of the address information read from the recording medium; and
determining whether the recording medium is suitable for being recorded to or being reproduced from by the given apparatus based on a result of said detecting step, the recording medium being suitable for being recorded to or being reproduced from by the given apparatus when no error is detected in the address information and being unsuitable for being recorded to or being reproduced from by the given apparatus when an error is detected in the address information.

2. A method as set forth in claim 1, wherein said determining step includes determining that the recording medium is not suitable for being recorded to or being reproduced from by the given apparatus, and notifying at least one user accordingly.

3. A method as set forth in claim 2, wherein said determining step includes calculating using the address information of at least one of the first address information and the second address information that have been read from the recording medium, and determining whether the recording medium is suitable for being recorded to or being reproduced from by the given apparatus depending on whether the calculated result equals a predetermined value.

4. A method as set forth in claim 3, wherein the first address information is information that represents at least the start position of the second area.

5. A method as set forth in claim 4, wherein the first address information represents at least minutes, seconds, and frames.

6. A method as set forth in claim 5, wherein a data portion that represents at least the frames of the first address information is varied according to data that represents a manufacturer of the recording medium.

7. A method as set forth in claim 1, wherein said determining step includes calculating using the address information of both of the first address information and the second address information that have been read from the recording medium, detecting whether the first address information and the second address information have an error depending on whether the calculated result equals a predetermined value, and determining that the recording medium is not suitable for being recorded to or being reproduced from by the given apparatus when the first address information and the second address information have an error.

8. A method as set forth in claim 7, wherein the first address information represents at least the start position of the second area.

9. A method as set forth in claim 8, wherein the first address information represents at least minutes, seconds, and frames.

10. A method as set forth in claim 9, wherein a data portion that represents at least the frames of the first address information is varied according to data that represents a manufacturer of the recording medium.

11. A method as set forth in claim 7, wherein the second address information represents at least the start position of the third area.

12. A method as set forth in claim 11, wherein the second address information represents at least minutes, seconds, and frames.

13. A method of recording to and/or reproducing from a recording medium using a given apparatus, said method comprising:

loading the recording medium into the given apparatus;

reading address information from the recording medium, the recording medium having at least a first area in which data is recordable, a second area, and a third area, the second area being followed by the first area, the first area being followed by the third area, the address information being at least one of first address information and second address information, the first address information representing the position of the second area, the second address information representing the position of the third area;

detecting a possible error in the address information based on a result generated using at least a portion of the address information read from the record medium; and determining whether the record medium is suitable for being recorded to or being reproduced from by the given apparatus based on a result of said detecting step, the recording medium being suitable for being recorded to or being reproduced from by the given apparatus when no error is detected in the address information and being unsuitable for being recorded to or being reproduced from by the given apparatus when an error is detected in the address information.

14. A method as set forth in claim 13, wherein said determining step includes determining that the recording medium is unsuitable for being recorded to or being reproduced from by the given apparatus when an error has been detected in the address information of at least one of the first address information and the second address information.

15. A method as set forth in claim 14, further comprising: displaying an alarm message that notifies a user that the recording medium is not suitable for being recorded to or being reproduced from by the given apparatus.

16. A method as set forth in claim 14, further comprising: generating an alarm sound that notifies a user that the recording medium is unsuitable for being recorded to or being reproduced from by the given apparatus.

17. A method as set forth in claim 13, further comprising: prohibiting the data from being recorded to the first area of the recording medium when said determining step determines that the recording medium is not suitable for being recorded to by the given apparatus.

18. A method as set forth in claim 17, further comprising: permitting data to be recorded to the first area of the recording medium when said determining step determines that the recording medium is suitable for being recorded to by the given apparatus.

19. A method as set forth in claim 13, further comprising: prohibiting reproduction of further data recorded in the first area of the recording medium when said determining step determines that the recording medium is not suitable for being reproduced from by the given apparatus.

20. A method as set forth in claim 13, further comprising: permitting reproduction of further data recorded in the first area of the recording medium when said determining step determines that the recording medium is not suitable for being reproduced from by the given apparatus.

21. A method as set forth in claim 13, further comprising: prohibiting recording of the data in the first area of the recording medium but permitting reproduction of further data recorded in the first area of the recording medium when said determining step determines that the recording medium is not suitable for being recorded to or being reproduced from by the given apparatus.

22. A method as set forth in claim 13, further comprising: permitting recording of the data in the first area of the recording medium but prohibiting reproduction of further data recorded in the first area of the recording medium when said determining step determines that the recording medium is not suitable for being recorded to or being reproduced from by the given apparatus.

* * * * *